United States Patent
Lechler et al.

(10) Patent No.: US 12,098,775 B2
(45) Date of Patent: Sep. 24, 2024

(54) VALVE ASSEMBLY

(71) Applicant: Robert Bosch GmbH, Stuttgart (DE)

(72) Inventors: Andreas Lechler, Moeglingen (DE); Jens Norberg, Marbach Am Neckar (DE); Patrick Schellnegger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/915,373

(22) PCT Filed: Mar. 12, 2021

(86) PCT No.: PCT/EP2021/056374
§ 371 (c)(1),
(2) Date: Sep. 28, 2022

(87) PCT Pub. No.: WO2021/204494
PCT Pub. Date: Oct. 14, 2021

(65) Prior Publication Data
US 2023/0243434 A1 Aug. 3, 2023

(30) Foreign Application Priority Data
Apr. 6, 2020 (DE) ...................... 10 2020 204 410.4

(51) Int. Cl.
*F16K 15/04* (2006.01)
*B60T 15/02* (2006.01)
(Continued)

(52) U.S. Cl.
CPC .......... *F16K 15/042* (2013.01); *F16K 15/044* (2013.01); *F16K 17/0406* (2013.01);
(Continued)

(58) Field of Classification Search
CPC .. F16K 15/042; F16K 15/044; F16K 17/0406; F16K 17/0433; F16L 55/033; B60T 15/02; Y10T 137/7927
See application file for complete search history.

(56) References Cited

U.S. PATENT DOCUMENTS 2,308,876 A * 1/1943 Hammett .............. F16K 15/042
137/533.15
2,714,392 A   8/1955 Mercier
(Continued)

FOREIGN PATENT DOCUMENTS

DE     1931799 A1 *  1/1971
DE     101 05 747 A1  8/2002
(Continued)

OTHER PUBLICATIONS

International Search Report corresponding to PCT Application No. PCT/EP2021/056374, mailed Jun. 14, 2021 (German and English language document) (5 pages).

*Primary Examiner* — Marina A Tietjen
(74) *Attorney, Agent, or Firm* — Maginot, Moore & Beck LLP

(57) ABSTRACT

A valve assembly with a valve body, which has a fluid passage designed as a fluid inlet and at least one fluid passage designed as a fluid outlet, is disclosed. A fluid chamber connecting the fluid inlet to the at least one fluid outlet is formed in the valve body. A movably mounted closing body is positioned in the fluid chamber. The closing body is guided axially and/or radially by at least one guide ball. The at least one guide ball is arranged between the closing body and a lateral delimitation of the fluid chamber. A fluid passage is formed in the radial direction of the valve body.

13 Claims, 10 Drawing Sheets

(51) Int. Cl.
*F16K 17/04* (2006.01)
*F16L 55/033* (2006.01)

(52) U.S. Cl.
CPC ........ *F16K 17/0433* (2013.01); *F16L 55/033* (2013.01); *B60T 15/02* (2013.01)

(56) References Cited

U.S. PATENT DOCUMENTS

| | | |
|---|---|---|
| 3,589,386 A | 6/1971 | Chapman et al. |
| 4,151,861 A | 5/1979 | Bohrdt et al. |
| 4,556,195 A | 12/1985 | Calkins |
| 2003/0230929 A1* | 12/2003 | Inage ............... B60T 17/04 303/113.1 |

FOREIGN PATENT DOCUMENTS

| | | |
|---|---|---|
| DE | 102 24 430 A1 | 12/2003 |
| DE | 10 2013 202 588 A1 | 1/2014 |
| GB | 1186300 A * | 4/1970 |
| JP | 2004-68811 A | 3/2004 |

\* cited by examiner

VALVE ASSEMBLY

This application is a 35 U.S.C. § 371 National Stage Application of PCT/EP2021/056374, filed on Mar. 12, 2021, which claims the benefit of priority to Serial No. DE 10 2020 204 410.4, filed on Apr. 6, 2020 in Germany, the disclosures of which are incorporated herein by reference in their entirety.

The disclosure relates to a valve assembly having a valve body, which has a fluid passage designed as a fluid inlet and at least one fluid passage designed as a fluid outlet, wherein a fluid chamber which connects the fluid inlet to the at least one fluid outlet is formed in the valve body, wherein a movably mounted closing body is positioned in the fluid chamber, wherein the valve assembly is characterized in that the closing body is guided axially and/or radially by at least one guide ball, wherein the at least one guide ball is arranged between the closing body and a lateral boundary of the fluid chamber, and wherein one fluid passage is formed in the radial direction of the valve body.

BACKGROUND

Known vehicle brake systems with ABS and/or ESP functionality offer additional functions which assist the driver, for example, in maintaining a distance from the vehicle traveling in front. This is accomplished by an active intervention of the additional function in the vehicle brake system, in that pressure is built up at wheel brake calipers without the driver himself having actuated the brake pedal. To ensure that the driver does not hear any troublesome noises, the components involved must exhibit only slight vibration, if any. In most cases, cost-optimal ball/conical-seat valves are installed, but these tend to vibrate.

In particular, if no additional damping measures are installed, valve vibrations of the delivery unit can propagate directly in the form of pressure waves. These pressure waves then excite the body to vibrate at the line clips, and thus a noise is produced in the vehicle interior. In addition to the acoustic abnormalities, valve vibrations can cause mechanical wear on the components. Owing to the increased demands on pressure buildup dynamics (NCAP), the volume flow via the valves has increased. Since the vibration amplitudes increase with increasing volume flow via the pump outlet valve, wear is ultimately increased.

DE 102 24 430 A1 DE discloses a valve assembly of the type in question which is designed as a check valve and consists of a housing with an inlet opening and an outlet opening, in which an inner chamber is formed, which has a valve seat on the inlet side and in which there is a movably mounted closing body, the movement of which in the opening direction is limited by a stop and on which a valve spring acting in the closing direction of the check valve acts. In this case, the resulting force exerted on the closing body by the flow when the check valve is opened has a transverse component with respect to the opening direction. Moreover, the closing body is of asymmetrical design.

It can be considered disadvantageous here that the effect of vibration suppression is dependent on flow velocity and on fluid properties. Thus, the effect can be achieved only for certain temperature ranges and volume flows. A changeover to another fluid would result in different behavior.

DE 10 2013 202 588 A1 discloses a valve assembly which consists of a valve housing, in which a longitudinal channel connecting a valve inlet to a valve outlet is provided. Inserted into the longitudinal channel is a closing body which is acted upon by a closing spring in the direction of a valve seat formed in the valve housing. In order to bypass the closing body, a hydraulic orifice is preferably provided in a circuit parallel to the closing body. In order to damp vibrations of the closing body, an elastic friction element is arranged in the valve housing either upstream or downstream of the closing body, which friction element is accommodated in frictional engagement between the valve housing and the closing body. The elastic friction element is preferably designed as an O-ring.

It can be considered disadvantageous here that the effect of vibration suppression cannot be guaranteed over the life of the vehicle. Thus, abrasion reduces the lateral guidance, and geometric changes of the elastic friction element due to fluid absorption (swelling) have a negative effect on the opening behavior.

SUMMARY

A valve assembly having the features of the independent patent claim has the advantage that a one-sided flow is generated, as a result of which the closing body develops a preferential direction and moves in that direction at high volume flows and vibrates less strongly. At the same time, the use of defined axial and radial guidance for the closing element prevents or at least reduces one-sided loading of the components which arises as a result of the preferential direction—which would have a negative effect on service life without this guidance. The advantageousness of the preferential direction can thus be maintained over the service life of the vehicle.

Embodiments of the present disclosure provide a valve assembly having a valve body in which a fluid passage designed as a fluid inlet and at least one fluid passage designed as a fluid outlet are formed. A fluid chamber which connects the fluid inlet to the at least one fluid outlet is formed in the valve body. A movably mounted closing body is positioned in the fluid chamber. In this case, the closing body is guided axially and/or radially by at least one guide ball, wherein the at least one guide ball is arranged between the closing body and a lateral boundary of the fluid chamber. Furthermore, one of the fluid passages is formed in the radial direction of the valve body.

This is understood to mean that one fluid passage is formed radially with respect to the valve body. There is thus a lateral fluid passage in the valve body. This lateral fluid passage allows lateral fluid flow. Such fluid flow leads within the valve body to a hydraulic force which acts on the closing body located therein. Such lateral fluid flow or force leads to a lateral displacement of the closing body. This reduces the vibration of the closing element. In an advantageous embodiment, the valve assembly is characterized in that the at least one fluid outlet and/or the fluid inlet are/is formed substantially orthogonally to the direction of movement of the closing body. The fluid passage is advantageously configured in such a way that, when the valve is open, a fluid flow forms which generates a hydraulic force that acts on the closing body, wherein, in particular, the hydraulic force acts on the closing body orthogonally to the direction of movement of the closing body.

In the case of the valve assemblies known from the prior art, the clearance between the damping element and the lateral boundary of the fluid chamber can vary on account of tolerances, but also on account of material abrasion. This can lead to a diminution of the guidance or bracing or compression of the elastic friction element. In embodiments of the valve assembly according to the disclosure, on the other hand, the at least one guide ball is automatically readjusted.

Moreover, it is also possible to compensate for coaxiality errors or tolerances in the lateral boundary of the fluid chamber. Thus, the dimensional requirements on the components are lower, leading to lower manufacturing costs overall. The effect of the radial play compensation and the reduction of the tendency of the closing body to vibrate can be set by way of the geometry of the closing body and of the guide balls, and by way of the preloading force. The at least one guide ball is preferably embodied as a steel ball. Furthermore, the axial and radial guidance for the closing element makes it possible to reduce the one-sided loading of the components which arises as a result of the preferential direction—which would have a negative effect on service life without this guidance. By means of the combination of measures described, it is possible both to reduce vibration and to maintain functionality over the operating time.

In an advantageous embodiment, the valve assembly is characterized in that the at least one fluid outlet is formed in the radial direction of the valve body and the fluid inlet is formed in the axial direction of the valve body.

The valve body can have a cylindrical shape. As already described, the valve body contains a movable closing body in its interior. Here, the movement of the closing body when the valve is opened or closed is intended to define the said axial direction of the valve body. The radial direction of the valve body runs orthogonally to this direction of movement.

This is understood to mean that the fluid outlet is formed on the circumferential side of the valve body. In an advantageous embodiment, the valve assembly is characterized in that the at least one fluid outlet is formed substantially orthogonally to the direction of movement of the closing body, and the fluid inlet of the valve body is formed substantially axially to the direction of movement of the closing body. The fluid outlet is advantageously configured in such a way that, when the valve is open, a fluid flow forms which generates a hydraulic force that acts on the closing body, wherein, in particular, the hydraulic force acts on the closing body orthogonally to the direction of movement of the closing body.

In an alternative embodiment, the valve assembly is characterized in that the valve body is formed from a plurality of sub-bodies, wherein, in particular, the fluid outlet is formed between adjacent sub-bodies.

As already stated, the valve body encloses the closing body and further components. In this case, the valve body itself comprises a plurality of sub-bodies, for example a hat-shaped sleeve, which is closed in a fluidtight manner by a pressed-in spring retainer. In this way, simple assembly can advantageously be made possible. Alternatively, the valve body can also consist of two hat-shaped sleeves. A sleeve can, for example, be a sealing-seat valve body part, which comprises the sealing seat of the valve. The other sleeve can, for example, be a spring-seat valve body part, which comprises the spring seat of a return spring. In this case, too, a fluidtight connection between the two sleeves by compression is advantageous. In an advantageous embodiment, a fluid passage, in particular the fluid outlet, is formed between the two sub-bodies. In this way, the manufacturing process can advantageously be simplified. Moreover, additional manufacturing steps, for example boring of fluid outlets, can be avoided.

In an advantageous development, the valve assembly is characterized in that a plurality of fluid outlets is formed in the radial direction of the valve body, and these fluid outlets are arranged in such a way as to be irregularly distributed in the circumferential direction of the valve body.

This is understood to mean that there is a plurality of fluid outlets. There are two fluid outlets, for example. Alternatively, three or four fluid outlets are formed. Of course, it is also possible for more fluid outlets to be formed. If a plurality of lateral outlet channels is used, the pressure loss at the outlet valve can furthermore be further reduced without adversely affecting the tendency of the sealing ball to vibrate. These fluid outlets are furthermore formed in the circumferential direction of the valve body. The fluid outlets are advantageously distributed at irregular intervals over the circumference of the valve body. It is thereby possible to promote the formation of a preferential direction of the closing element. In an alternative embodiment, the fluid outlets can also be regularly distributed over the circumference.

In one embodiment of the disclosure, the valve assembly is characterized in that the closing body mounted movably in the fluid chamber is acted upon by a preloading force in the direction of a valve seat formed in the valve body, wherein, to open the valve seat, a fluid force acts on the closing body counter to the preloading force.

This is understood to mean that the closing body mounted movably in the fluid chamber is acted upon by a preloading force in the direction of a valve seat formed in the valve body, wherein, to open the valve seat, a fluid force acts on the closing body counter to the preloading force.

In a further advantageous embodiment of the valve assembly, a return spring and/or a magnet can provide the preloading force. In this case, the return spring can be supported at one end on the ball retainer and at the other end on a spring retainer or on the valve body. It is, of course, also possible for the spring retainer to be designed as an integrated component of the valve body. When a magnet is used to generate the preloading force, it preferably acts on a ferromagnetic ball retainer. In this case, magnetic force can act alone, in a manner assisted by a spring force or alternatively counter to a spring force.

Embodiments of the valve assembly according to the disclosure can be used, for example, as check valves or as dynamic restrictors in a hydraulic vehicle brake system.

Advantageous improvements of the valve assembly indicated in independent patent claim 1 are possible by means of the measures and developments presented in the dependent claims.

It is particularly advantageous that the preloading force acts at an angle on the closing body via the at least one guide ball and braces the at least one guide ball against the closing body, and therefore a resulting force on the closing body has an axially acting closing component and a transverse component acting perpendicularly to the closing component.

In an advantageous embodiment of the valve assembly, a hysteresis behavior during a closing process can be predetermined by a frictional force acting between the at least one guide ball and the lateral boundary of the fluid chamber. In this case, the effective frictional force can be predetermined and adapted to the respective application via the number and dimensions of the guide balls and the design of the lateral boundary of the fluid chamber, for example.

In a further advantageous embodiment of the valve assembly, the at least one guide ball can be arranged on a ball retainer which is movably guided in the fluid chamber. In this case, the effective preloading force can act on the at least one guide ball via the ball retainer. The shape of the ball retainer can be selected as desired in order to prevent "drifting" of the at least one guide ball downstream. If a plurality of guide balls is used, the spring force can be distributed more uniformly between the guide balls by means of the ball retainer. Moreover, the ball retainer has a radial play with respect to the lateral boundary of the fluid chamber and can additionally be rounded at the outer edge in order to prevent tilting. To enable the fluid to flow downstream, flow cross sections, the configuration of which can be chosen as desired, are provided on the ball retainer. Thus, for example, the ball retainer can have at least one passage and/or at least one recess, which in each case form a flow cross section.

In a further advantageous embodiment of the valve assembly, the closing body can be embodied as a sealing ball or as a sealing bush. In this case, the closing body is embodied with corresponding rounded portions in such a way that radial play compensation with the at least one guide ball arranged downstream is possible. Moreover, additional functions, such as a static restrictor as a bypass can be implemented in the closing body.

In a further advantageous embodiment of the valve assembly, the closing body can have a sealing region and a guide extension. The sealing region can be embodied, for example, as a spherical cap on which the guide extension can be integrally formed.

In a further advantageous embodiment of the valve assembly, the guide extension can have a round cross section and can be embodied as a cone or truncated cone or cylinder. Alternatively, the guide extension can have a polygonal cross section. In this case, corresponding chambers can be formed between outer surfaces of the guide extension and the lateral boundary of the fluid chamber.

In a further advantageous embodiment of the valve assembly, a plurality of guide balls can be arranged in the fluid chamber, which guide the closing body axially and/or radially. In this case, the guide balls can be arranged in the fluid chamber in such a way that the guide balls support one another in the circumferential direction. This means that the number of balls is selected in such a way that they can support one another in the circumferential direction, and non-uniform displacement of the balls can be prevented. In this way, it is possible, for example, to prevent all the balls from being located on only one side of the closing body.

Alternatively, the guide balls can be positioned and guided by suitable means, as in a cage in ball bearings. In this case, the configuration of the positioning means is a matter of free choice. Thus, for example, the ball retainer can have corresponding depressions as positioning means, which in each case at least partially accommodate and position a guide ball. By way of the depressions, the guide balls can have defined spacings from one another. Moreover, the chambers formed between the outer surfaces of the guide extension and the lateral boundary of the fluid chamber can in each case at least partially accommodate and position a guide ball. By means of a specific configuration of the guide extension, it is thus possible to achieve movable positioning of the balls. Moreover, the positioning means can be embodied as axial retention grooves which are introduced into the valve body and which can in each case at least partially accommodate and position a guide ball.

In a further advantageous embodiment of the valve assembly, the ball retainer can be embodied, for example, as a retention ball or as a disk or as a retention capsule or as a retention sleeve. The embodiment as a retention ball allows low-cost implementation of the ball retainer. The retention capsule can at least partially accommodate one end of the return spring, and the return spring can be supported on the bottom of the retention capsule. Moreover, the embodiment as a retention capsule or retention sleeve makes possible better guidance in the fluid chamber without tilting. Furthermore, an open end of the retention capsule, together with the spring retainer, can form a stop for the purpose of limiting the opening movement of the closing body. An edge of the retention sleeve facing away from the closing body, together with the spring retainer or an additional stop disk, can also form a stop for the purpose of limiting the opening movement of the closing body.

In a further advantageous embodiment of the valve assembly, a static restrictor can form a permanent fluid connection between the fluid inlet and the fluid outlet.

The static restrictor can be formed, for example, in the sealing bush or in the valve body.

In a further advantageous embodiment of the valve assembly, the fluid chamber can have a cylindrical fluid chamber section or a stepped fluid chamber section between the valve seat and the fluid outlet. Since the transverse force is dependent not only on the geometry of the closing body, the at least one guide ball and the preloading force but also on the configuration of the lateral boundary of the fluid chamber, desired valve properties can thereby be made possible. Thus, a transition between different cross sections of the stepped fluid chamber section can have, for example, a linear or curved profile in the opening direction with an increasing or decreasing opening cross section. Alternatively, a transition between different cross sections of the stepped fluid chamber section can have a linear or curved profile with a decreasing opening cross section up to a turning point and, starting from the turning point, can have a linear or curved profile with an increasing opening cross section in the opening direction. Moreover, the at least one guide ball can be arranged in the region of the transition between different cross sections of the stepped fluid chamber section.

Exemplary embodiments of the disclosure are illustrated in the drawing and are explained in greater detail in the following description. In the drawing, identical reference signs denote components or elements which perform identical or analogous functions.

DETAILED DESCRIPTION

Figure 1:
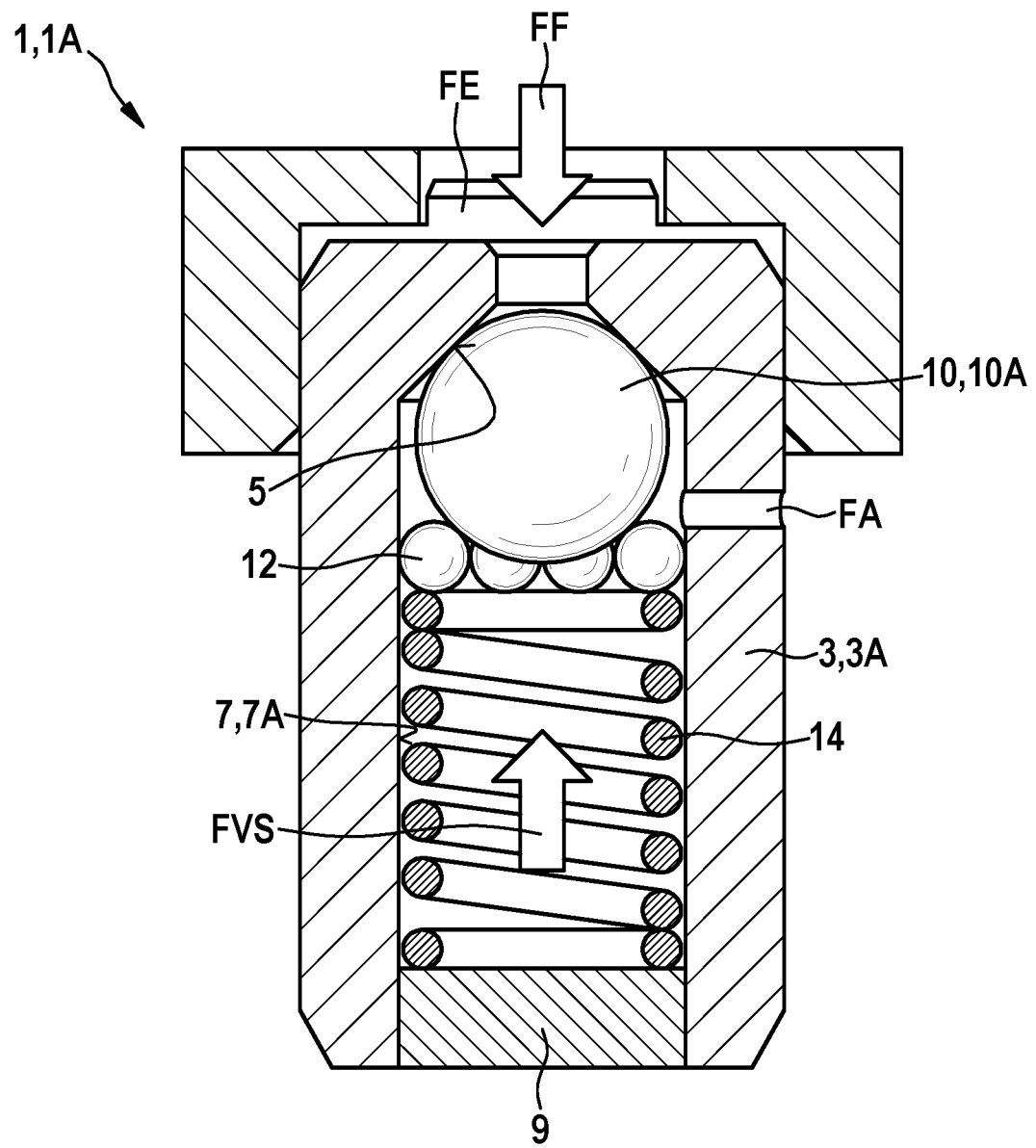
FIG. 1 shows a schematic sectional illustration of a first exemplary embodiment of a valve assembly according to the disclosure in the closed state.

As can be seen from FIGS. 1 to 9, the illustrated exemplary embodiments of a valve assembly 1 according to the disclosure each comprise a valve body 3, 3A, 3B, 3C, in which a fluid chamber 7 connecting a fluid inlet FE to a fluid outlet FA is formed. A closing body 10 mounted movably in the fluid chamber 7 is acted upon by a preloading force FVS in the direction of a valve seat 5 formed in the valve body 3, 3A, 3B, 3C, wherein, to open the valve seat 5, a fluid force FF acts on the closing body 10 counter to the preloading force FVS. During this process, the closing body 10 is guided axially and/or radially by at least one guide ball 12. Moreover, the at least one guide ball 12 is arranged between the closing body 10 and a lateral boundary of the fluid chamber 7. As can be seen from FIGS. 1 to 6, the fluid chamber 7 of the valve assembly 1 has at least one cylindrical fluid chamber section 7A.

As can furthermore be seen from FIGS. 1 to 9, the preloading force FVS acts at an angle on the closing body 10 via the at least one guide ball 12 and braces the at least one guide ball 12 against the closing body 10, and therefore a resulting force on the closing body 10 has an axially acting closing component and a transverse component acting perpendicularly to the closing component.

As can furthermore be seen from FIGS. 1 to 9, the valve assembly 1 in the exemplary embodiments illustrated is in each case embodied as a dynamic restrictor 1A, 1B, 1C, 1D, 1E. In the case of the dynamic restrictors 1A, 1B, 1C, 1D, 1E shown, the stroke of the closing body 10 is set as a function of the preloading force FVS and the fluid force FF. The valve body 3, 3A, 3B comprises a plurality of fluid passages, e.g. a fluid inlet FE and a fluid outlet FA.

The fluid inlet FE is embodied as an opening in the circular bottom surface of the valve body 3, 3A, 3B. This permits an inlet flow which is substantially axial to the movement of the closing body 10. The valve seat 5 is introduced as a conical seat at the inner edge of the opening in the bottom of the hat-shaped sleeve. Of course, the valve seat 5 and/or the valve body 3, 3A, 3B can also have another suitable shape.

The fluid outlet FA is embodied as a lateral opening in the valve body 3, 3A, 3B. This permits an outlet flow which is substantially orthogonal to the movement of the closing body 10. It can be seen from FIGS. 1 to 4 that the fluid outlet FA is implemented, for example, as a bore in the outer wall of the hat-shaped sleeve of the valve body 3, 3A. It can be seen from FIGS. 5 to 9 that the valve body 3, 3B is composed of two elements, a sealing-seat valve body part 3.1 and a spring-seat valve body part 3.2. Here, the fluid outlet FA is formed, for example, as an aperture between the two elements 3.1, 3.2.

As can furthermore be seen from FIGS. 1 to 6, in the exemplary embodiments illustrated a plurality of guide balls 12 is arranged in the fluid chamber 7 in addition to the closing body 10, which is illustrated as a sealing ball 10A in the exemplary embodiments of the valve assembly 1 illustrated in FIGS. 1 to 6. The number and dimensions of the guide balls 12 can be freely selected and adapted to the installation space conditions or to the design of the closing body 10 and the fluid chamber 7.

The guide balls 12 guide the closing body 10 radially and/or axially. As a result, vibrations of the closing body 10 are prevented or at least reduced, and therefore the noise behavior of the valve assembly 1 is considerably improved. The position of the guide balls 12 can be distributed as desired on the closing body 10. In the exemplary embodiments illustrated, the guide balls 12 are arranged downstream of the closing body 10. The guiding behavior of the guide balls 12 is improved by the preloading force FVS, which in the illustrated exemplary embodiments is implemented by a return spring 14 or by a magnetic force, since the at least one guide ball 12 is braced against the closing body 10. As a result, a radial force acts on the guide balls 12 in addition to the axial force transmitted. This radial force counteracts axial and/or radial vibrations of the closing body 10. The effect of the radial play compensation and the reduction of the tendency of the valve assembly 1 to vibrate can be set by way of the geometry of the closing body 10 and of the guide balls 12 and by way of the preloading force. The guide balls 12 are preferably embodied as steel balls.

By means of the frictional force between the guide balls 12 and the lateral boundary of the fluid chamber 7, it is possible to achieve a hysteresis behavior which leads to delayed closing of the valve assembly 1 in situations with a high desired flow rate. As a result, the valve assembly 1 presents a reduced fluidic resistance to successive pump delivery strokes.

Figure 2:
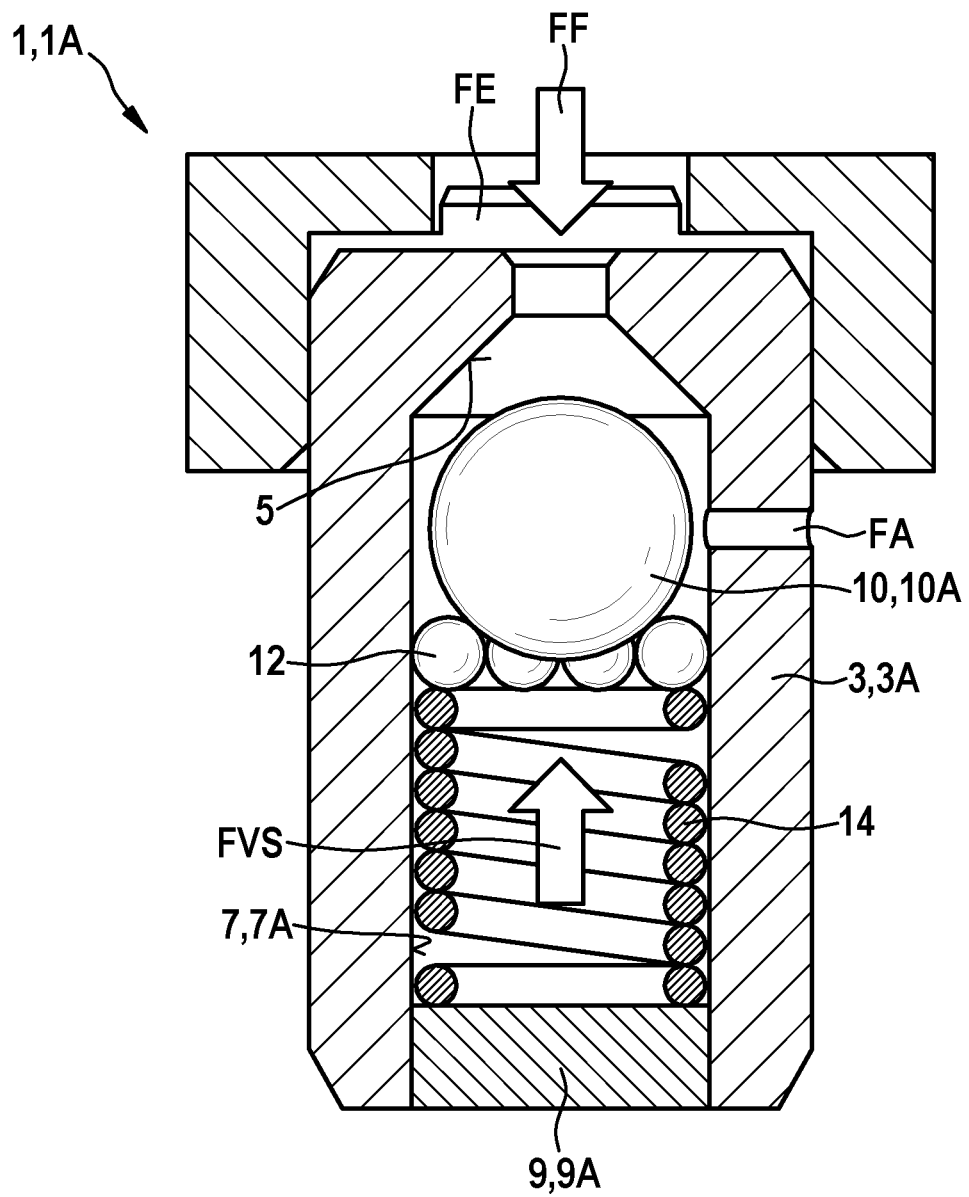
FIG. 2 shows a schematic sectional illustration of the valve assembly according to the disclosure from FIG. 1 in the open state.

As can furthermore be seen from FIGS. 1 and 2, the valve assembly 1 or the dynamic restrictor 1A in the exemplary embodiment illustrated comprises a plurality of guide balls 12 and a return spring 14, which brings about the preloading force FVS on the guide balls 12. As can also be seen from FIGS. 1 and 2, the return spring 14 in the exemplary embodiment illustrated is embodied as a spiral spring which is supported at one end on a spring retainer 9 and at the other end on the guide balls 12. In the exemplary embodiment illustrated, the spring retainer 9 is embodied as a retention disk 9A and is pressed into the fluid chamber 7 at the open end of the valve body 3A.

In the closed state of the valve assembly 1, which is illustrated in FIG. 1, the effective preloading force FVS of the return spring 14 is greater than the fluid force FF acting from the outside at the fluid inlet FE, and therefore the preloading force FVS of the return spring 14 presses the closing body 10 or the sealing ball 10A into the valve seat 5 via the guide balls 12.

In the open state of the valve assembly 1, which is illustrated in FIG. 2, the effective preloading force FVS of the return spring 14 is less than the fluid force FF acting from the outside at the fluid inlet FE, and therefore the fluid force FF presses the closing body 10 or the sealing ball 10A out of the valve seat 5 against the preloading force FVS of the return spring 14. By means of the guide balls 12, the closing body 10 or sealing ball 10A is guided radially and axially during the opening movement and during the closing movement.

In addition to the described embodiment as a sealing ball 10A, other embodiments for the closing body 10 are, of course, also possible, such as, for example, as a sealing bush, as a spherical cap, or as a special shape of a sealing region with an adjoining guide extension.

As can furthermore be seen from FIGS. 3 to 6, the illustrated exemplary embodiments of the valve assembly 1 comprise a ball retainer 16 as an additional component, on which the at least one guide ball 12 is arranged. The ball retainer 16 can have various suitable shapes and is guided so as to be axially movable with radial play in the fluid chamber 7. Moreover, the effective preloading force FVS acts on the at least one guide ball 12 via the ball retainer 16. The ball retainer 16 is intended to prevent "drifting" of the at least one guide ball 12 downstream and to distribute the preloading force FVS more uniformly between the guide balls 12.

Figure 3:
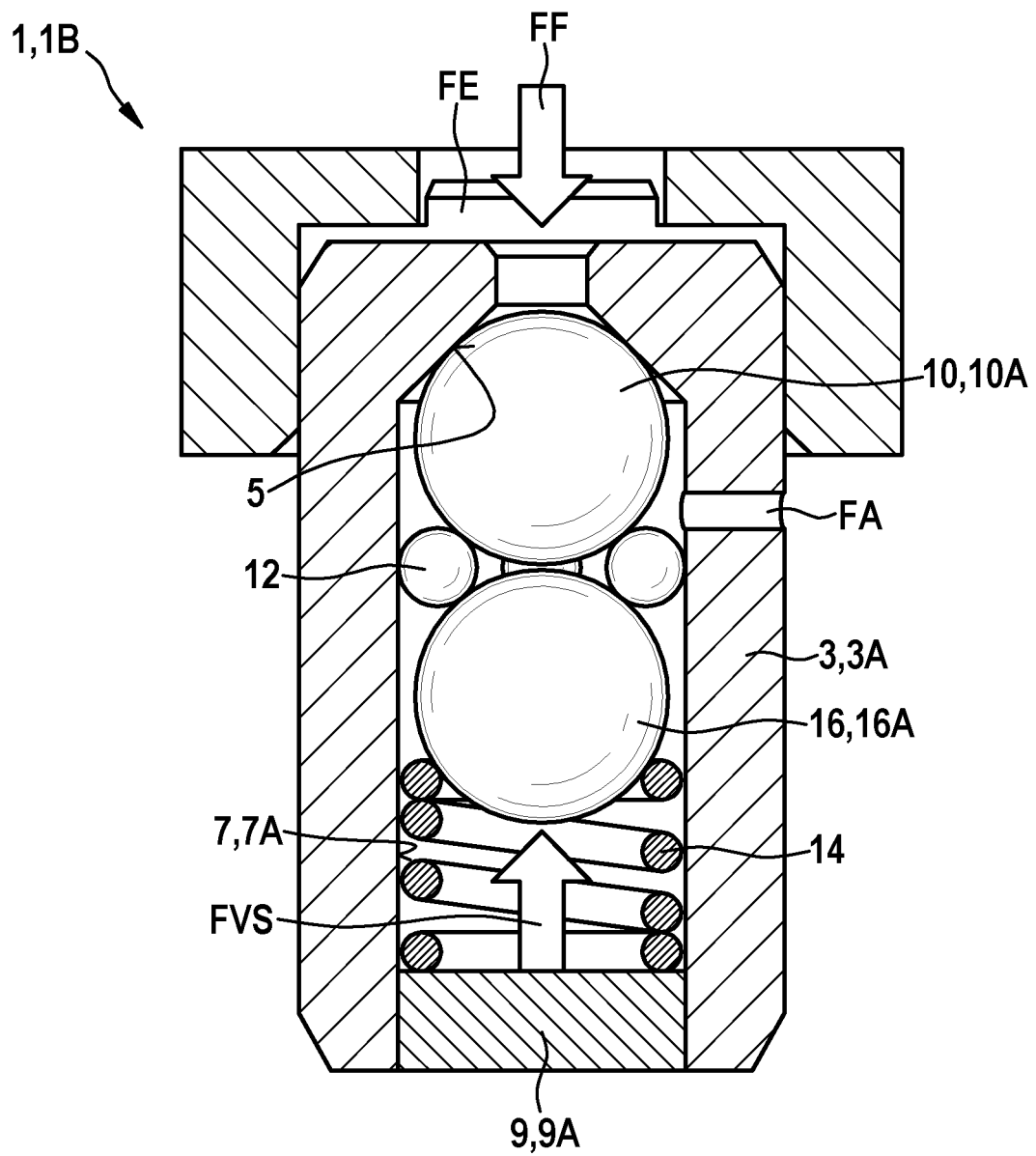
FIG. 3 shows a schematic sectional illustration of a second exemplary embodiment of a valve assembly according to the disclosure in the closed state.

As can furthermore be seen from FIG. 3, the valve assembly 1 or the dynamic restrictor 1B in the exemplary embodiment illustrated comprises a plurality of guide balls 12 and a return spring 14, embodied as a spiral spring, which brings about the preloading force FVS on the guide balls 12. As can furthermore be seen from FIG. 3, a ball retainer 16 is arranged between the return spring 14 and the guide balls 12. In the exemplary embodiment illustrated, the ball retainer 16 is embodied as a retention ball 16A. In this case, the return spring 14 is supported at one end on a spring retainer 9 embodied as a retention disk 9A and at the other end on the retention ball 16A. In the exemplary embodiment illustrated, the spring retainer 9 is pressed into the fluid chamber 7 at the open end of the valve body 3A.

Figure 4:
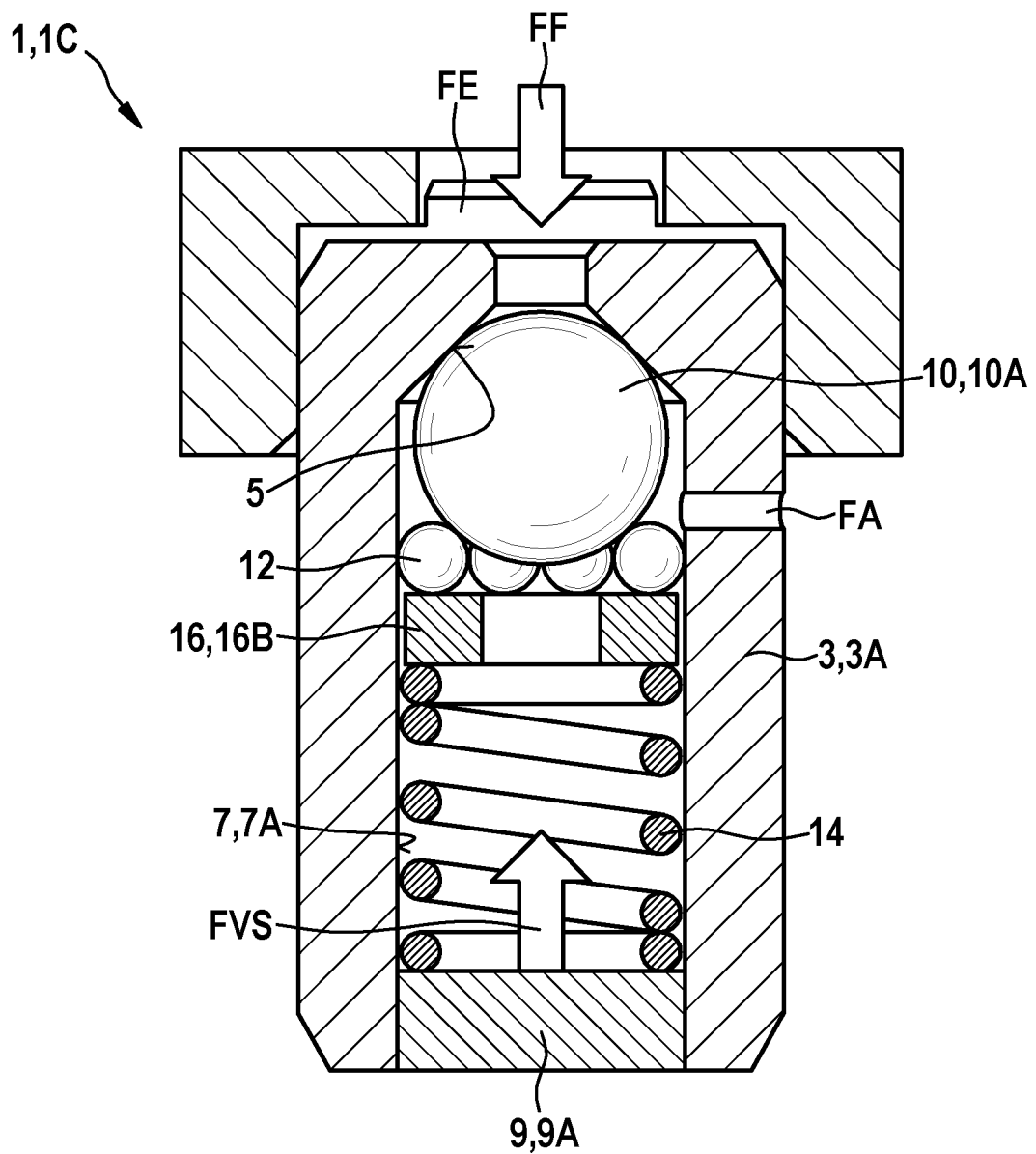
FIG. 4 shows a schematic sectional illustration of a third exemplary embodiment of a valve assembly according to the disclosure in the closed state.
Figure 5:
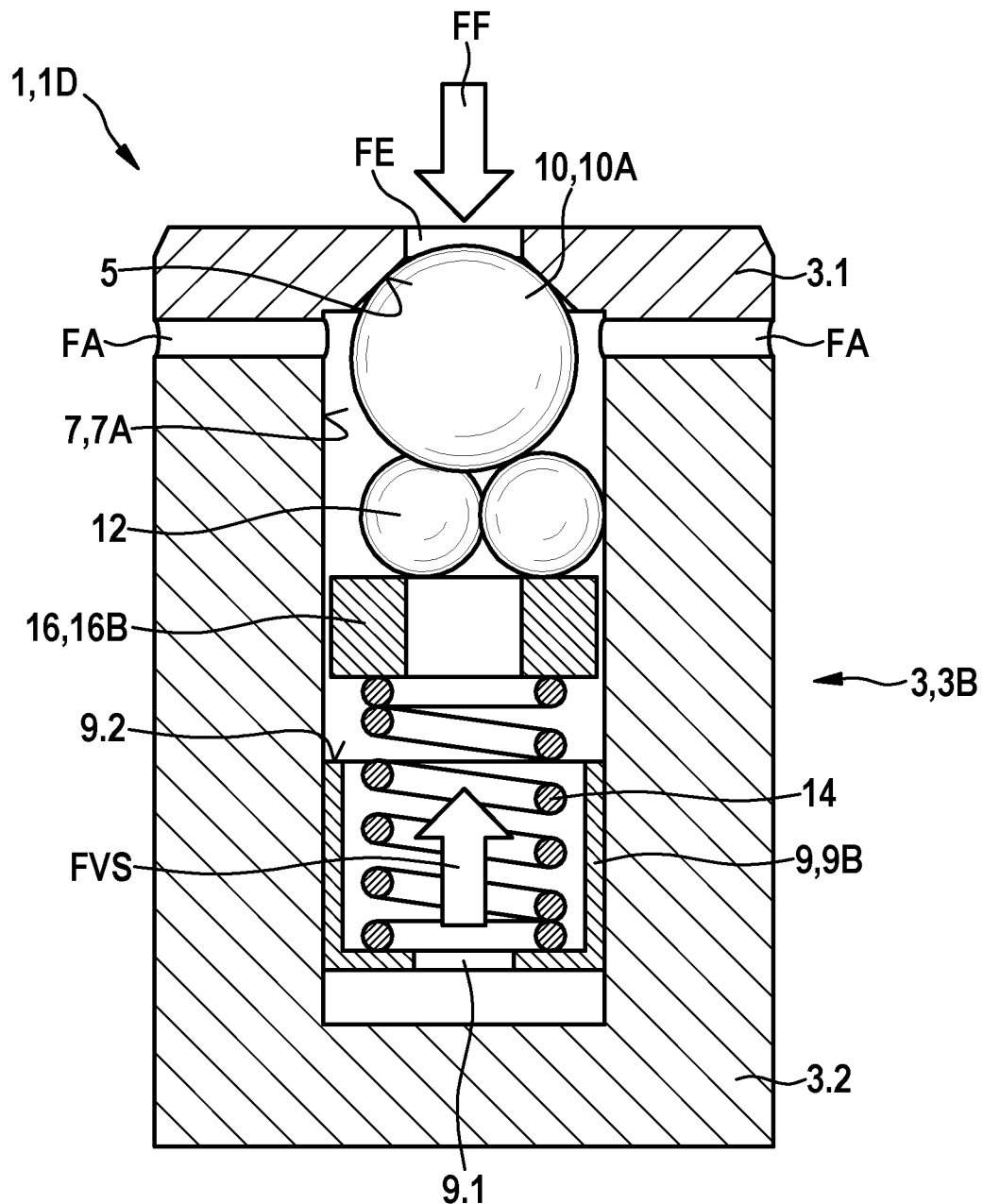
FIG. 5 shows a schematic sectional illustration of a fourth exemplary embodiment of a valve assembly according to the disclosure in the closed state.

As can furthermore be seen from FIGS. 4 and 5, the valve assembly 1 or the dynamic restrictor 1C, 1D in the exemplary embodiments illustrated comprises a plurality of guide balls 12 and a return spring 14, embodied as a spiral spring, which brings about the preloading force FVS on the guide balls 12. As can furthermore be seen from FIGS. 4 and 5, a ball retainer 16 is arranged between the return spring 14 and the guide balls 12. In the exemplary embodiments illustrated, the ball retainer 16 is embodied as a disk 16B. The ball retainer 16 embodied as a disk 16B has at least one flow cross section in order to allow fluid volume compensation in the fluid chamber 7 during a movement.

Figure 10:
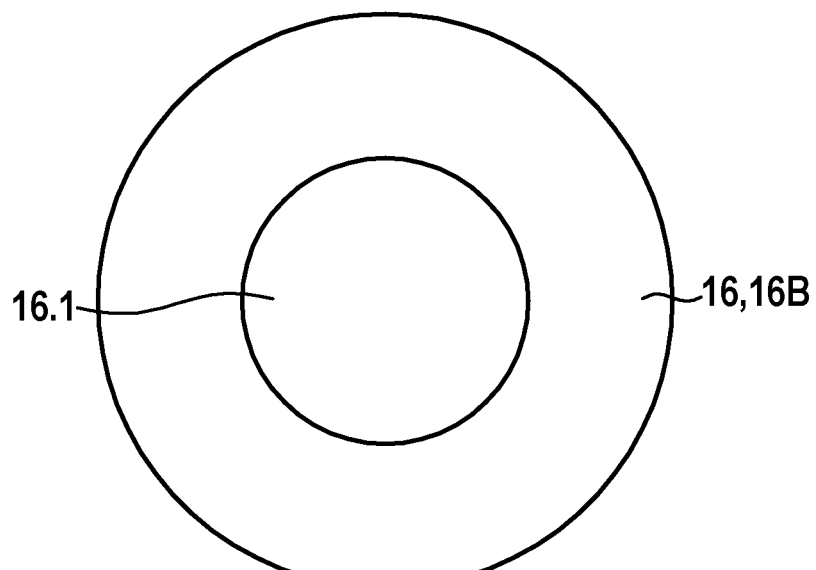
FIGS. 10 to 13 each show a schematic plan view of one exemplary embodiment of a ball retainer for a valve assembly according to the disclosure.
Figure 11:
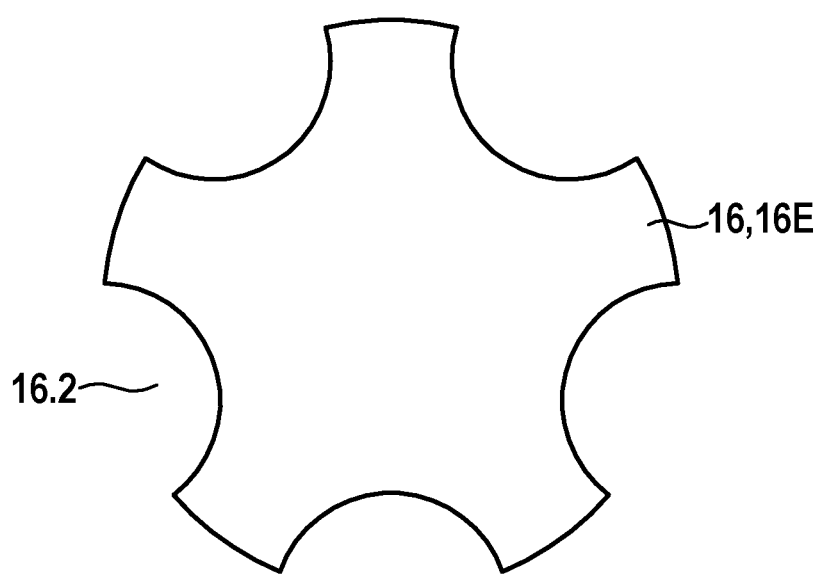
Figure 12:
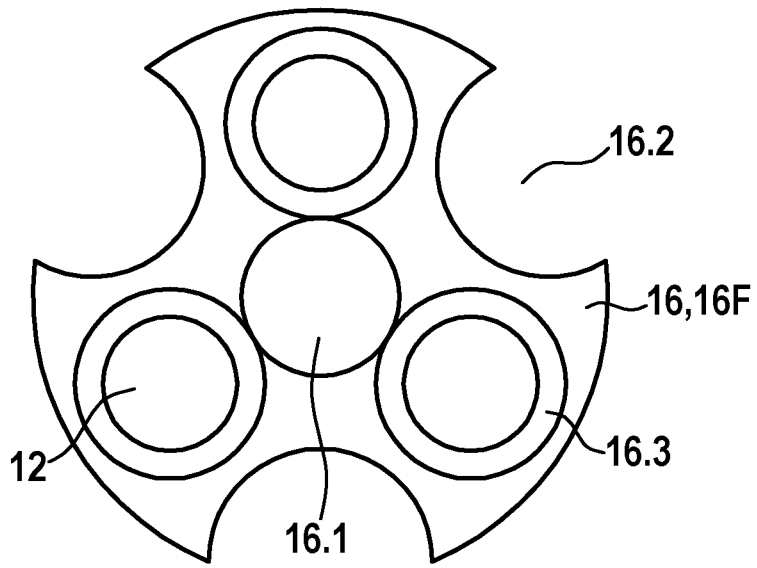

As can furthermore be seen from FIGS. 10 to 12, the disk 16B, 16E, 16F can have at least one passage 16.1 and/or at least one recess 16.2, which in each case form at least one flow cross section. As can furthermore be seen from FIGS. 4, 5 and 10, the illustrated disk 16B in each case has a central passage 16.1. As can furthermore be seen from FIG. 11, the illustrated disk 16E has a plurality of recesses 16.2 formed at the edge. As can furthermore be seen from FIG. 12, the illustrated disk 16F has a central passage 16.1 and a plurality of recesses 16.2 formed at the edge.

As can furthermore be seen from FIG. 4, the return spring 14 in the exemplary embodiment illustrated is supported at one end on a spring retainer 9 embodied as a retention disk 9A and at the other end on the ball retainer 16 embodied as a disk 16B. In the exemplary embodiment illustrated, the spring retainer 9 is pressed into the fluid chamber 7 at the open end of the valve body 3A.

As can furthermore be seen from FIG. 5, the spring retainer 9 in the exemplary embodiment illustrated is embodied as a retention cup 9B, which is pressed into the fluid chamber 7 and at least partially accommodates the return spring 14. At the bottom, the retention cup 9B has a central passage 9.1. As can furthermore be seen from FIG. 5, the return spring 14 in the exemplary embodiment illustrated is supported at one end on the bottom of the retention cup 9B and at the other end on the disk 16B. Moreover, the open end of the retention cup 9B forms a stop 9.2, which limits the opening movement of the closing body 10.

Figure 6:
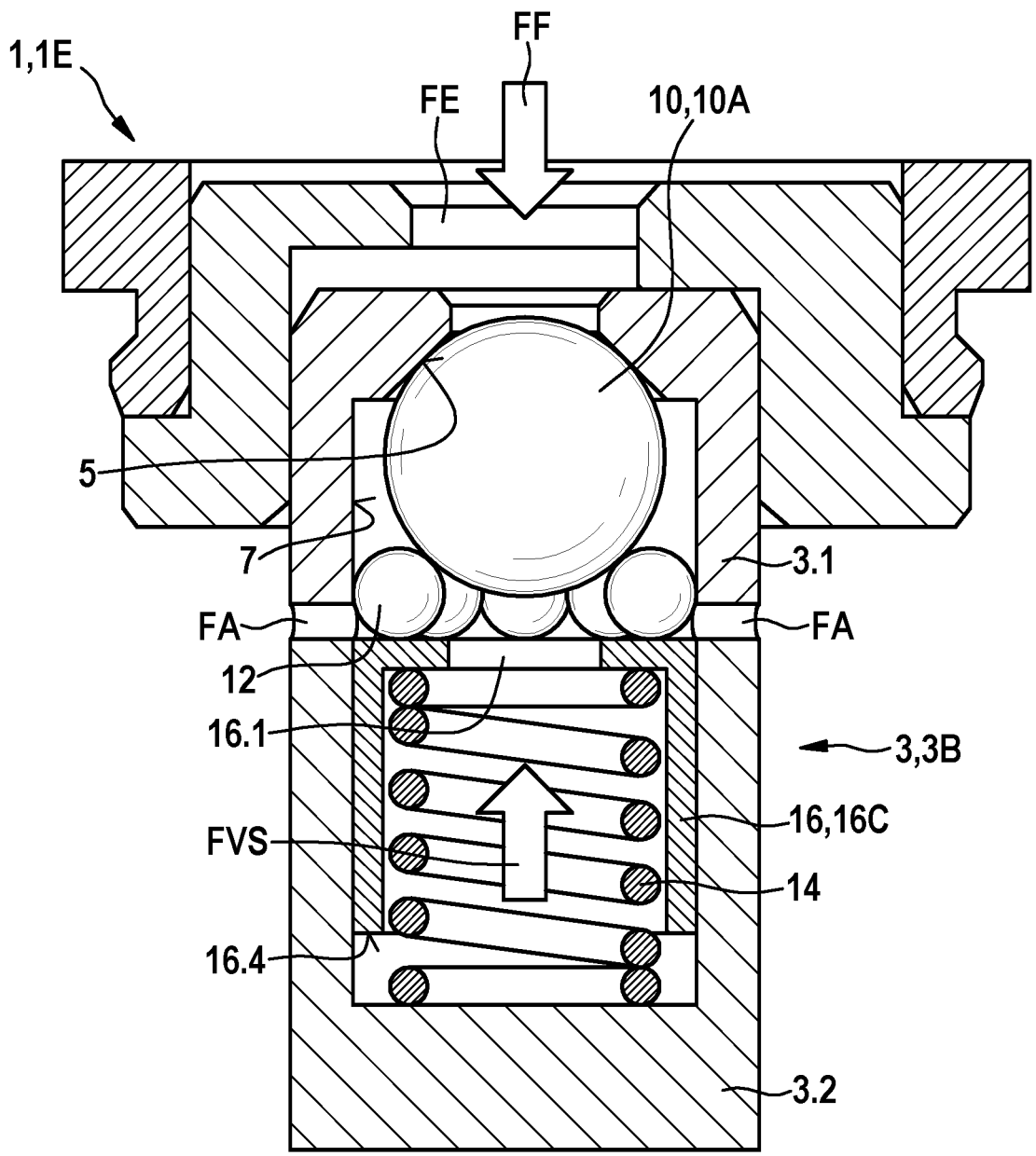
FIG. 6 shows a schematic sectional illustration of a fifth exemplary embodiment of a valve assembly according to the disclosure in the closed state.

As can furthermore be seen from FIG. 6, the valve assembly 1 or the dynamic restrictor 1E in the exemplary embodiment illustrated comprises a plurality of guide balls 12 and a return spring 14, embodied as a spiral spring, which brings about the preloading force FVS on the guide balls 12. As can furthermore be seen from FIG. 6, a ball retainer 16 is arranged between the return spring 14 and the guide balls 12. In the exemplary embodiment illustrated, the ball retainer 16 is embodied as a retention capsule 16C, which at least partially accommodates the return spring 14 and has a central passage 16.1 at the bottom. In this case, the return spring 14 is supported at one end on a spring retainer 9 embodied as a retention disk 9A and at the other end on the bottom of the retention capsule 16C. In the exemplary embodiment illustrated, the spring retainer 9 is embodied with a central passage 9.1 and is pressed into the fluid chamber 7 at the open end of the valve body 3B.

As can furthermore be seen from FIGS. 5 and 6, the valve assembly 1 or the dynamic restrictor 1D, 1E in the exemplary embodiments illustrated in each case comprises a static restrictor 2, which forms a permanent fluid connection between the fluid inlet FE and the fluid outlet FA. As can furthermore be seen from FIGS. 5 and 6, the static restrictor 2 in the exemplary embodiments illustrated is in each case formed in the bottom of the valve body 3B, which is designed as a hat-shaped sleeve.

It can furthermore be seen from FIGS. 5 and 6 that the valve body 3, 3B comprises a plurality of fluid outlets FA. In the sectional view, two fluid outlets FA can be seen, which lie opposite one another in the circumferential direction. There may also be further fluid outlets.

It can furthermore be seen from FIGS. 5 and 6 that the valve body 3, 3B is formed from a plurality of elements. In these exemplary embodiments, the valve body 3B comprises, for example, two pot-shaped elements. Of these, the first element contains the sealing seat and is referred to as the sealing-seat valve body part 3.1. The second element comprises the spring seat and is referred to as the spring-seat valve body part 3.2. Here, the fluid outlet FA is embodied as an aperture between the two elements 3.1, 3.2. For example, by virtue of their shape, the sealing-seat valve body part 3.1 and the spring-seat valve body part 3.2 have recesses and/or projections or offsets, for example, which, in interaction, permit a fluid to pass between the two elements. The sealing-seat valve body part 3.1 and the spring-seat valve body part 3.2 are pressed together in a fluidtight manner.

Figure 7:
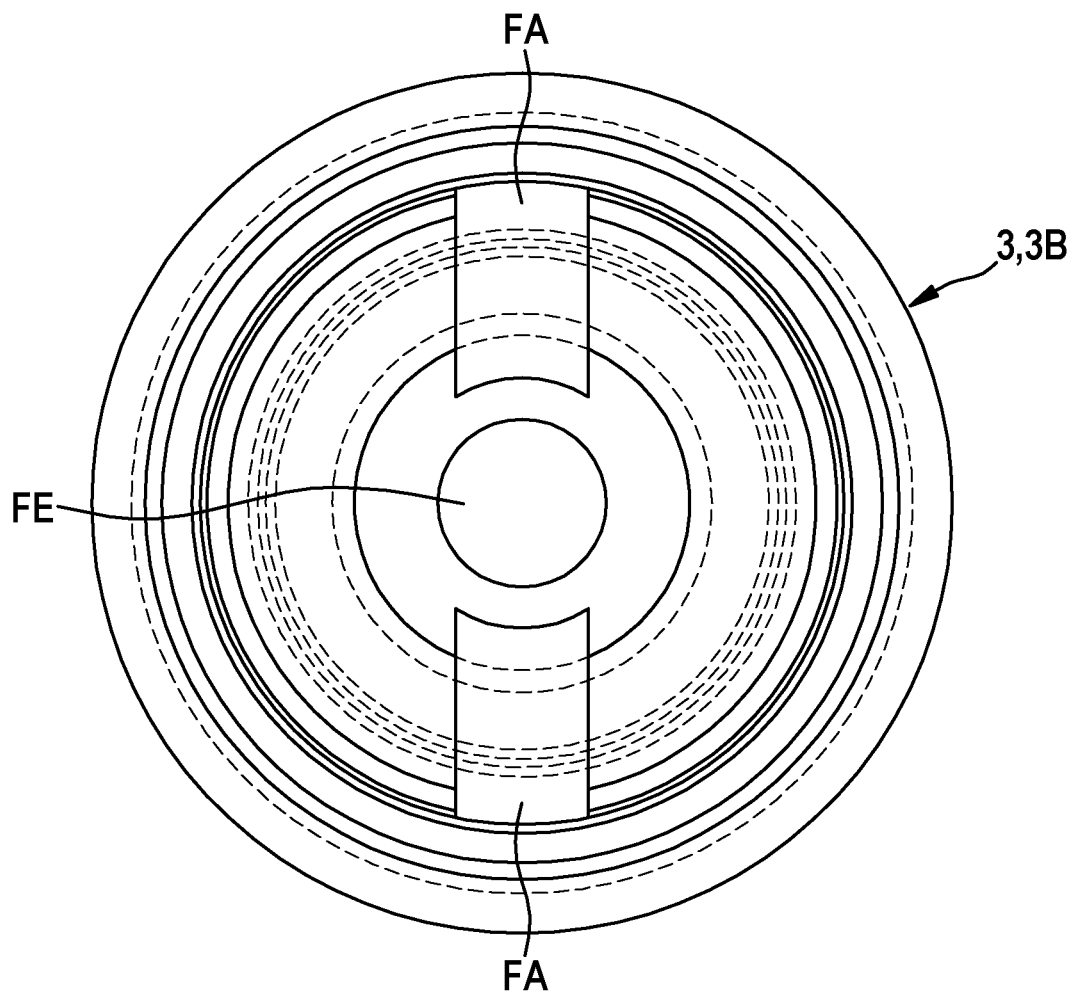
FIG. 7 shows a schematic illustration of a valve body according to one exemplary embodiment in plan view.

FIG. 7 furthermore shows a schematic illustration of a valve body 3, 3B in plan view. In this case, the valve body comprises a sealing-seat valve body part 3.1 and a spring-seat valve body part 3.2. These elements have a corresponding shape in order to permit a fluid to pass between the two elements in the assembled state. The sealing-seat valve body part 3.1 and the spring-seat valve body part 3.2 have recesses and projections or offsets. These form two fluid outlets FA in the side walls of the valve body 3, 3B. The fluid inlet FE is designed as an opening in the bottom surface of the valve body 3, 3B.

Figure 8:
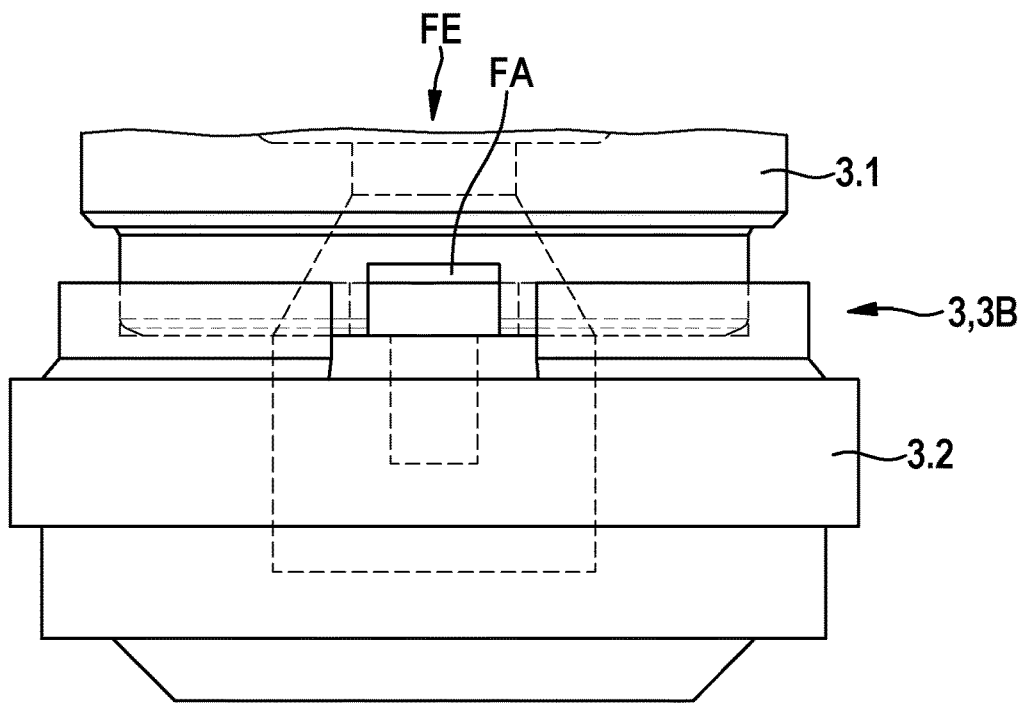
FIG. 8 shows a schematic illustration of a valve body according to one exemplary embodiment consisting of two sub-bodies in a phantom view.

FIG. 8 shows a schematic illustration of a valve body 3, 3B according to one exemplary embodiment consisting of two sub-bodies. In this case, the overlap of the sealing-seat valve body part 3.1 and of the spring-seat valve body part 3.2 in the assembled state can be clearly seen. Likewise, the fluid outlet FA formed is shown centrally. The fluid inlet FE is indicated in the upper region.

Figure 9:
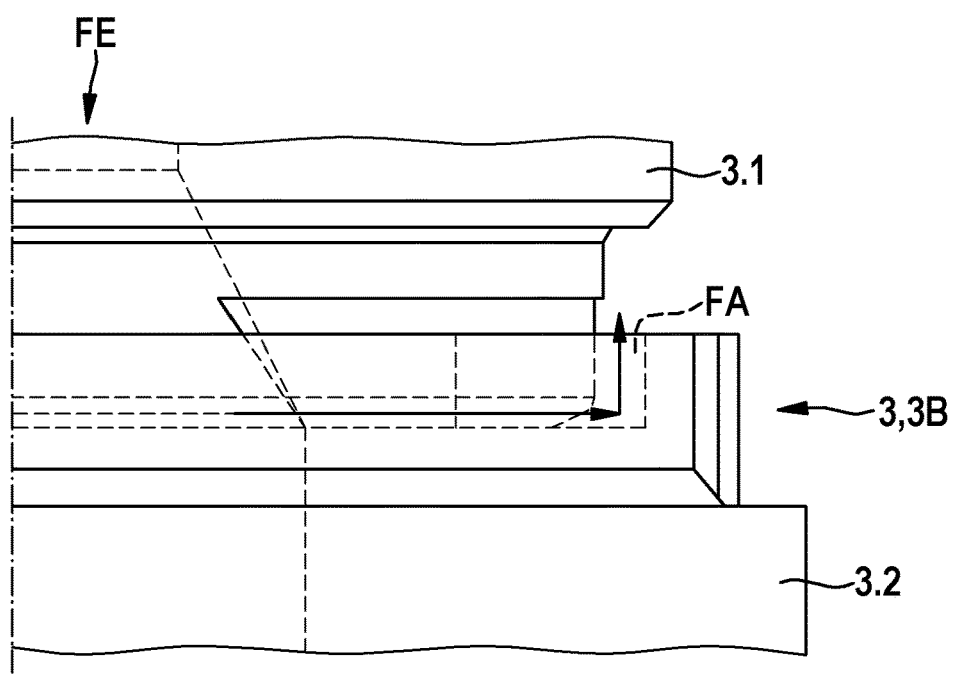
FIG. 9 shows a schematic detail illustration of a valve body according to one exemplary embodiment consisting of two sub-bodies with illustration of a lateral fluid outflow on the valve body.

FIG. 9 shows a schematic detail illustration of a valve body 3, 3B according to one exemplary embodiment consisting of two sub-bodies. In this case, it can be clearly seen how throughflow is made possible by virtue of the formed shape of the sealing-seat valve body part 3.1 and of the spring-seat valve body part 3.2. For this purpose, the fluid flow resulting from an opened valve is illustrated by means of flow arrows. As illustrated, the lateral fluid outflow takes place substantially orthogonally to the direction of movement of the closing body 10. The closing body 10 is not illustrated in the figure, but its movement for opening or closing the valve runs along the valve body center line, which is illustrated by dashed lines. The fluid outlet from the valve body therefore takes place substantially orthogonally to the direction of movement of the closing body.

Figure 13:
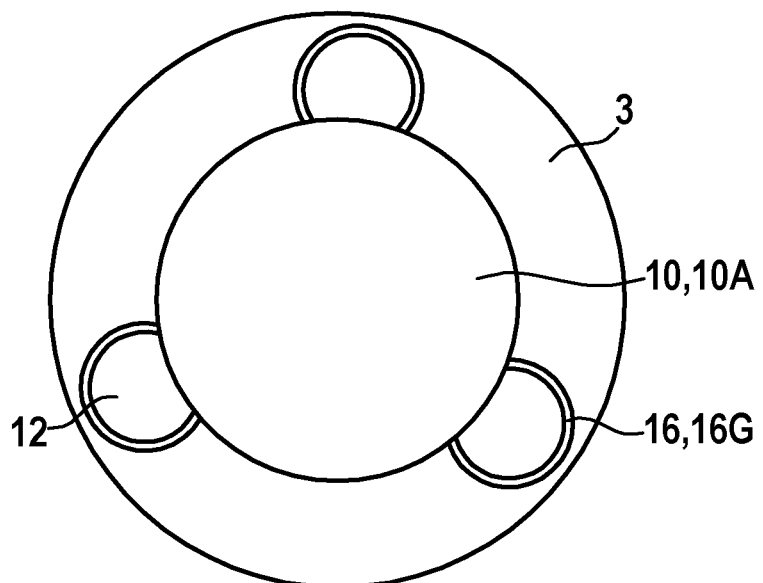

As shown in FIG. 13, the positioning structure 16 can be embodied as axial retention grooves 16G which are introduced into the valve body 3 and which can in each case at least partially accommodate and position a guide ball 12.

The invention claimed is:

1. A valve assembly, comprising:
 a valve body having a fluid inlet passage and at least one fluid outlet passage, the valve body further having a fluid chamber configured to connect the fluid inlet passage to the at least one fluid outlet passage;
 a closing body movably mounted in the fluid chamber; and
 at least one guide ball arranged between the closing body and a lateral boundary of the fluid chamber, the at least one guide ball being configured to guide axial and/or radial movement of the closing body within the fluid chamber,
 wherein:
   the at least one fluid outlet passage is formed in the radial direction of the valve body, and
   the at least one fluid outlet passage includes a plurality of fluid outlet passages which are each formed in the radial direction of the valve body, the plurality of fluid outlet passages configured such that fluid flows in parallel from the fluid chamber through the plurality of outlet passages.

2. The valve assembly as claimed in claim 1, wherein the fluid inlet passage is formed in the axial direction of the valve body.

3. The valve assembly as claimed in claim 1, wherein the valve body is formed from a plurality of sub-bodies.

4. The valve assembly as claimed in claim 3, wherein the fluid outlet passage is formed between adjacent sub-bodies of the plurality of sub-bodies.

5. The valve assembly as claimed in claim 1, wherein the plurality of fluid outlet passages are distributed in the circumferential direction of the valve body.

6. The valve assembly as claimed in claim 1, wherein:
 the at least one guide ball includes a plurality of guide balls arranged in the fluid chamber, and
 the plurality of guide balls are held in place by a positioning structure.

7. The valve assembly as claimed in claim 6, wherein:
 the ball retainer includes the positioning structure,
 the positioning structure defines a plurality of depressions, and
 the plurality of depressions are configured to at least partially accommodate and position the plurality of guide balls, respectively.

8. The valve assembly as claimed in claim 6, wherein:
 the positioning structure defines axial retaining grooves which are defined in the valve body, and
 the axial retaining grooves are configured to at least partially accommodate and position the plurality of guide balls, respectively.

9. The valve assembly as claimed in claim 1, further comprising a return spring positioned in the fluid chamber, wherein:
 the valve body further has a valve seat,
 the return spring is configured to generate a preloading force which acts upon the closing body in the direction of the valve seat, and
 to create an opening between the closing body and the valve seat, a fluid force is configured to act on the closing body counter to the preloading force.

10. The valve assembly as claimed in claim 9, further comprising a ball retainer movably guidable in the fluid chamber, wherein:
 the at least one guide ball is arranged on the ball retainer, and
 the preloading force acts on the at least one guide ball via the ball retainer.

11. The valve assembly as claimed in claim 10, wherein:
 the ball retainer has at least one passage and/or at least one recess, and
 the at least one passage and/or the at least one recess each form a flow cross section.

12. The valve assembly as claimed in claim 10, further comprising a spring retainer positioned in the fluid chamber, wherein:
 the return spring is supported at one end on the ball retainer and at the other end on the spring retainer.

13. The valve assembly as claimed in claim 12, wherein the spring retainer is designed as an integrated component of the valve body.

* * * * *